United States Patent [19]
Young et al.

[11] 4,428,425
[45] Jan. 31, 1984

[54] SINGLE PASS FILTRATION OF OIL OR GAS WELL COMPLETION FLUIDS

[75] Inventors: John A. Young; Richard E. Munson, both of Baton Rouge, La.

[73] Assignee: Baker Oil Tools, Inc., Orange, Calif.

[21] Appl. No.: 467,160

[22] Filed: Feb. 18, 1983

Related U.S. Application Data

[63] Continuation of Ser. No. 300,654, Sep. 9, 1981, abandoned, which is a continuation of Ser. No. 189,676, Sep. 22, 1980, abandoned.

[51] Int. Cl.³ .................. E21B 43/40; B01D 25/12
[52] U.S. Cl. ................... 166/267; 210/747; 210/777; 210/805; 210/226; 210/231; 252/8.55 R
[58] Field of Search .......... 210/747, 767, 777, 778, 210/805, 806, 808, 170, 224, 225, 226, 231; 175/66, 205; 166/267; 252/8.55 R

[56] References Cited

U.S. PATENT DOCUMENTS

| 1,042,803 | 10/1912 | Krassa | 210/225 |
| 2,989,187 | 6/1961 | Demeter | 210/231 |
| 3,241,678 | 3/1966 | Wrotnowski | 210/226 |
| 3,669,267 | 6/1972 | Hutton | 210/778 |
| 3,698,557 | 10/1972 | Ishigaki | 210/225 |
| 4,166,035 | 8/1979 | Ramstech | 210/231 |
| 4,219,425 | 8/1980 | Yoshida | 210/225 |
| 4,222,873 | 9/1980 | Parsons | 210/777 |
| 4,285,821 | 8/1981 | Hiesinger | 210/777 |

FOREIGN PATENT DOCUMENTS 536462  12/1955  Italy .................. 210/224

Primary Examiner—Ernest G. Therkorn
Attorney, Agent, or Firm—Norvell & Associates

[57] ABSTRACT

A single pass filtration process for the removal of suspended solids from completion fluids used in oil or gas well drilling operations which utilizes pressure injection of these fluids into a filter having pattern filter plates.

5 Claims, 4 Drawing Figures

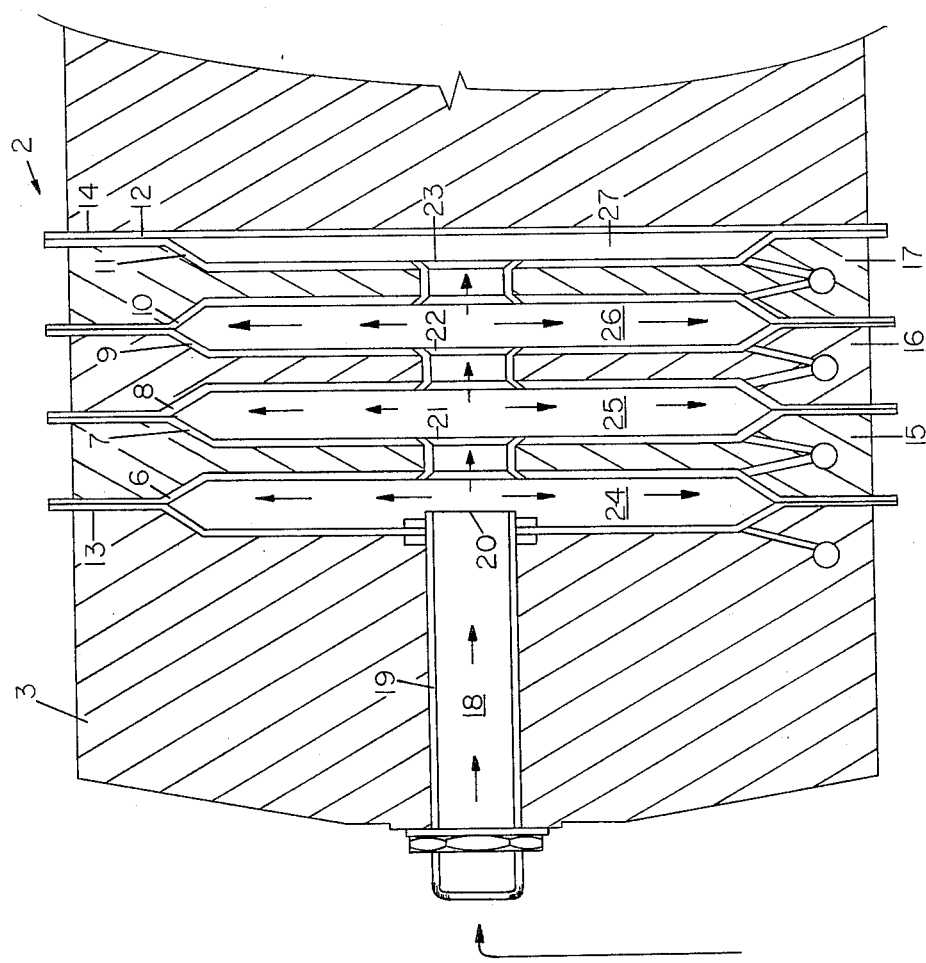

SINGLE PASS FILTRATION OF OIL OR GAS WELL COMPLETION FLUIDS

RELATED APPLICATIONS

This application constitutes a continuation of application Ser. No. 300,654 filed Sept. 9, 1981, which in turn is a continuation of application Ser. No. 189,676, filed Sept. 22, 1980, both now abandoned.

BACKGROUND OF INVENTION

1. Field of the Invention

This invention relates to oil and gas well drilling and more particularly to the removal of suspended solids which are normally present in completion fluids used in these drilling operations.

2. Prior Art

In oil and gas well drilling operations, it is necessary to pump clean completion fluids such as $CaCl_2$, $CaBr_2$ or $ZnBr_2$ into the producing zone in order to clean the formation pores thus enhancing flow from the formation to the well head. These completion fluids are recirculated into the producing zone a sufficient number of time to achieve the desired pore purity. Unfortunately any suspended solids which are present in such fluids can be deposited in the producing formation where they can be trapped by the matrix or in the perforation tunnels of the formation and reduce productivity. It is very difficult to remove these solids once they have been placed into the formation, especially if they have been pumped some distance into the formation matrix from the well bore. Thus, it is desirable to remove these solids prior to initial injection and subsequent recirculation into the well bores.

Currently, the preferred filtering method is the cartridge (sock type or string wound) filter elements made of fiber, paper, cotton, sisal and other materials. These elements are fitted over a perforated core and sealed. The fluid is then pumped through the filter elements and out of the perforated core. However, these systems must use multiple pass filtration through progressively finer filter cartridges. Thus, this filtration system is very time consuming, i.e., average time for completing the cleaning of the formation pores is ten days. Additionally, as reported by Sparlin and Guidry, *Study of Filters Used for Filtering Workover Fluids,* Society of Petroleum Engineers Paper 7005, 1968, this method of filtration only removes approximately 85% of the suspended solids present in the fluid. The remainder therefore is injected into the producing formation where it can cause damage and reduction of production rates.

SUMMARY OF THE INVENTION

Therefore, it is an object of this invention to provide a single pass filtration process for the removal of suspended solids in injection fluids used in oil and gas well drilling and production.

Another object of this invention is to provide a single pass filtration process which removes a substantially higher percentage of suspended solids from completion fluids used in oil and gas well drilling and production than current methods accomplish.

Still another object of this invention is to provide a filtration process that substantially reduces the time to clean formation bores in the producing zone of an oil and gas well bore.

These objects and other advantages of this invention will become apparent from the ensuing descriptions of the invention.

Accordingly, a single pass filtration process for the removal of at least 99% of suspended solids greater than 1 micron in diameter found in recovered oil or gas well completion fluids is provided wherein the recovered completion fluids are pressure injected into a multi-chambered container having cavities formed by filter plates, the faces of which have a raised pattern creating channels in the faces, the channels having openings covered by a filter cloth through which clear injection fluid flows from said cavity.

BRIEF DESCRIPTION OF THE DRAWINGS

FIG. 2 is a more detailed cross-sectional view taken along line 2—2 of FIG. 1.

PREFERRED EMBODIMENTS OF THE INVENTION

Figure 1:
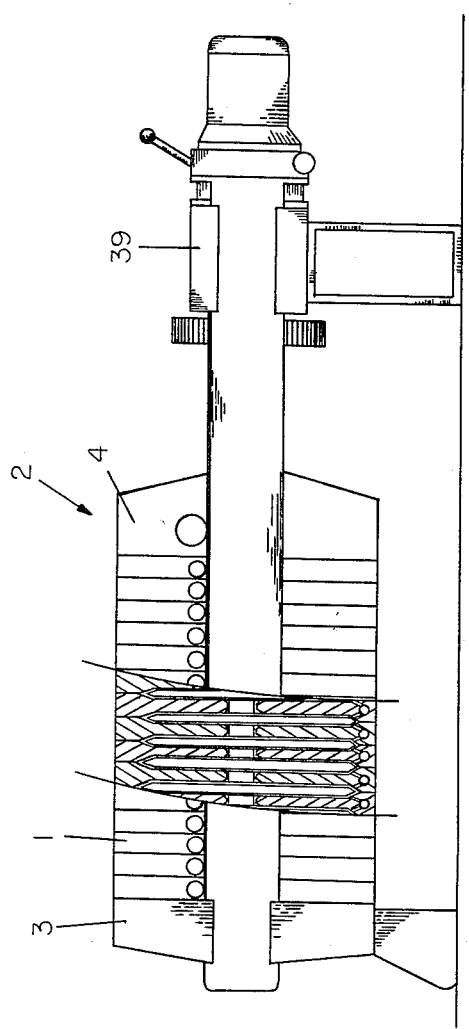
FIG. 1 is a cutaway three-dimensional view of a preferred embodiment of a filter press which can be used in the single pass filtration process of this invention.

Referring to FIG. 1, a number of filter plates 1 are fitted onto press frame 2 between fixed end 3 and travelling end 4. Then travelling end 4 is closed so that filter plates 1 are tightly sealed to each other.

Referring to FIG. 2, polypropylene filter cloths 5, 6, 7, 8, 9, 10, 11 and 12 have been mounted on the face 13 of the fixed end 3 and travelling end face 14 and filter plates 15, 16, and 17 prior to the closing of press frame 2. Completion fluid is pumped through channel 18 of feed tube 19 under a pressure of 20–100 psi where it flows through feed holes 20, 21, 22 and 23 into filter chambers 24, 25, 26 and 27.

Figure 4:
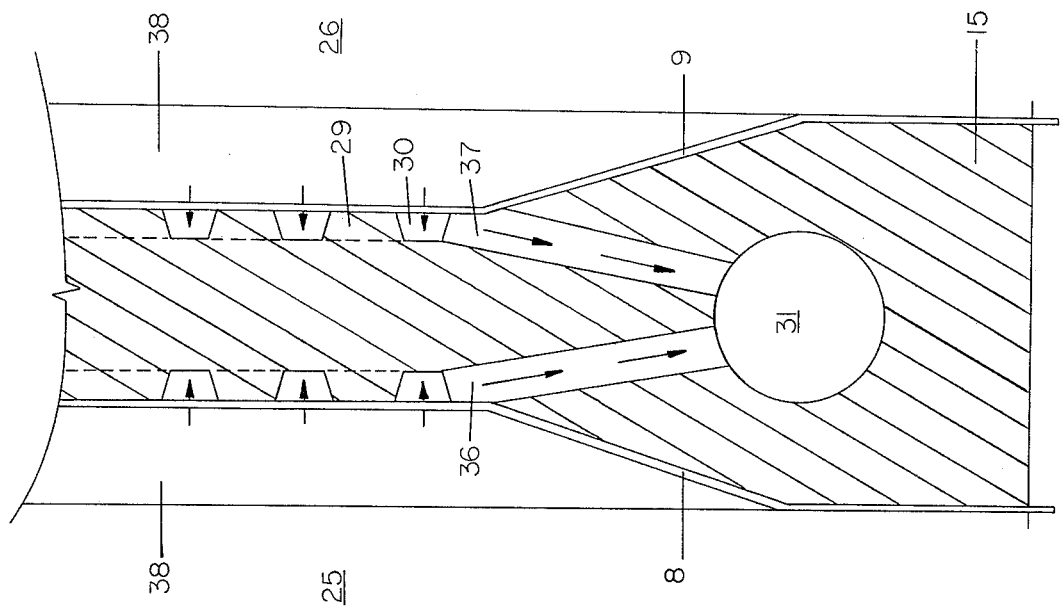
FIG. 4 is a cross-sectional view of the press frame in its opened position for cleaning.
Figure 3:
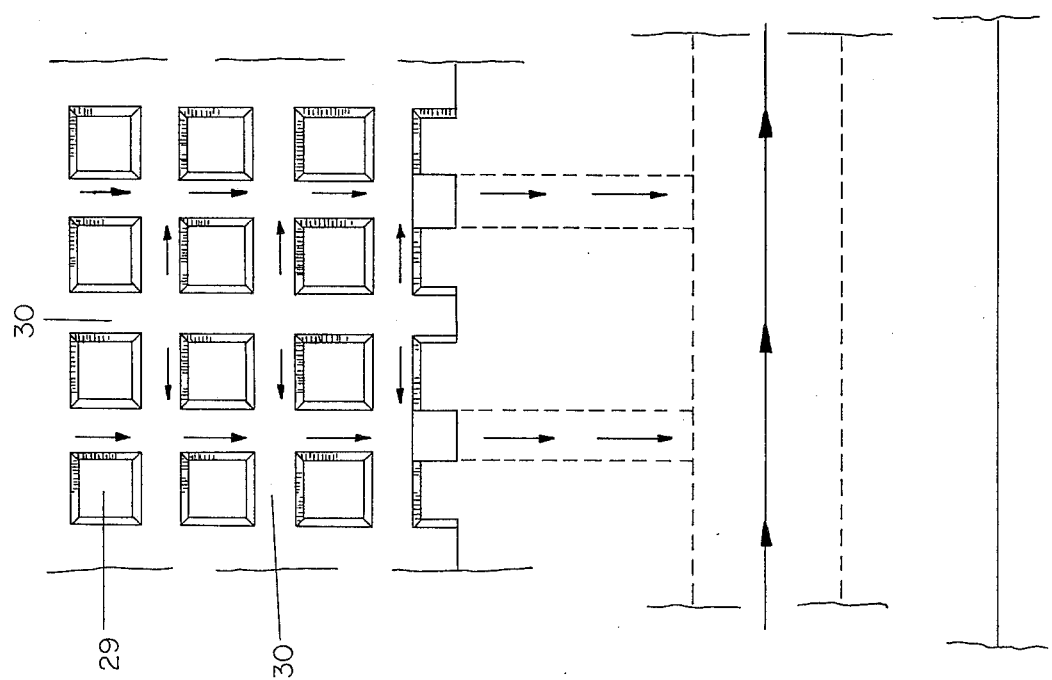
FIG. 3 is a frontal view of a preferred embodiment of the raised patterned face of a preferred filter plate utilized in this invention.

Referring now to FIGS. 3 and 4, each filter plate has a pattern of raised pyramid shaped faces 29 with which provides filtrate channels 30 for the filtrate collection and flow. Thus, the completion fluid passes from the filter chambers 25 and 26 through the filter cloths 8 and 9 into filtrate channels 30 where it flows to filtrate port 31 through filtrate collection channels 36 and 37. The product at this point is clean fluid which is then stored for reuse.

Still referring to FIG. 4, as completion fluid 31 is forced through filter cloths 8 and 9 from filter chambers 25 and 26, cake 38 forms on the face of filter cloths 8 and 9 from the solids which were suspended in the completion fluid. Cakes 38 also act as a filtering medium at this point. Eventually, however, filter chambers 25 and 26 become completely filled with cake 38 at which point the filtering process is completed for one cycle.

Referring to FIG. 1, fluid feeding pump 39 is stopped and any back pressure is released through a bypass valve. Then travelling end 4 is retracted and filter plates 15 and 17 are separated forming a gap between travelling end 4 and fixed end 3. As filter plates 15 and 17 are moved to form gaps, cake 38 falls out for disposal. Thus, the whole cycle is ready to repeat again.

In another preferred embodiment, raised patterned face 29 in FIG. 3 uses a three-dimensional trapezoidal form (as a pyramid with the top cut off) to form filtrate channels 30.

In still another preferred embodiment, filter aids such as diatomaceous earth or Perlite are added to filter cloths 5–12 to eliminate blinding or impingement of the suspended solids in the completion fluid into the interstices of the filter cloth which allows for complete filling of the filter chambers with cake 38.

It is also preferred that the filtration system be sealed to the outside environment so as not to contaminate the completion fluid with dust or other extraneous particulate matter.

There are, of course, many other alternates and embodiments of this invention not specifically mentioned, which are meant to be included within the scope of this invention as defined by the following claims.

What I claim is:

1. A single pass filtration process for removing at least about 99% of particulate material of a size in excess of about one micron from subterranean well completion fluids, comprising the steps of:
    (1) forcing the well completion fluid under pressure through a vertical planar expanse of filter cloth pre-treated with a filter aid, said filter cloth abutting a rigid supporting surface having a multiplicity of channels communicating with a peripheral channel; and
    (2) removing the filtrate from the peripheral channel.

2. The process of claim 1 wherein the well completion fluids are aqueous-based, and comprise $CaCl_2$, $CaBr_2$ or $ZnBr_2$.

3. The process of claim 1 or 2 wherein the filter cloth is pre-treated with a filter aid comprising diatomaceous earth.

4. The process of claim 1 or 2 wherein the filter cloth is pre-treated with a filter aid comprising perlite.

5. A method for treating and removing at least about 99% of contaminate particulate matter of a size in excess of about one micron from fluid circulated into, through and out of a subterranean well, comprising the steps of:
    (1) establishing a fluid flow path into, through and out of said well;
    (2) circulating fluid in said flow path;
    (3) introducing said circulated fluid under pressure into and through a vessel having a vertical planar expanse of filter cloth pre-treated with a filter aid, said filter cloth abutting a rigid supporting surface having a multiplicity of channels communicating with a peripheral channel;
    (4) removing the filtrate from the peripheral channel; and
    (5) circulating into said well the filtrate discharged from said vessel.

* * * * *